Oct. 23, 1951     A. L. SWEIGART     2,572,779

HARDNESS TESTER

Filed Sept. 24, 1948

*INVENTOR.*
ARTHUR L. SWEIGART
BY
*Arthur M. Smith*
ATTORNEY

Patented Oct. 23, 1951

2,572,779

UNITED STATES PATENT OFFICE 2,572,779

HARDNESS TESTER

Arthur L. Sweigart, Borger, Tex., assignor to United Carbon Company, Inc., Charleston, W. Va., a corporation of Maryland Application September 24, 1948, Serial No. 51,023

3 Claims. (Cl. 73—94)

The present invention relates to improvements in a hardness tester, and in particular to such a hardness tester which is adapted to measure the amount of force necessary to crush an object, or pellet of material, such for example as agglomerated carbon black.

Although the hardness tester of the present invention has been found particularly useful in testing the hardness of pellets of agglomerated carbon black, it is not limited in its application to this use. The device of the present invention may be used in any instance where it is desired to know accurately the amount of force necessary to crush or deform an object or sample of material.

Carbon black cannot be handled and shipped in bulk in the finely divided, flocculent condition in which it is collected during its manufacture. Therefore, agglomerating processes have been developed which convert the finely divided, flocculent carbon black powder into pellets of various sizes which are easy to handle and which possess varying physical properties according to the type of agglomerating process and the length of treatment. One of the properties for which such pellets are tested is hardness or resistance to breakdown under crushing loads. It is desirable, therefore, to have a device for measuring accurately the loads which may be imposed on such pellets.

Therefore, it is a principal object of the present invention to provide an efficient hardness tester suitable for use in testing the hardness of objects such as pellets of agglomerated carbon black, the tester being of a rugged construction, easy to operate, and accurate to a high degree.

It is a further object of the present invention to provide a hardness tester which may be economically manufactured.

It is another object of the present invention to provide a hardness tester which is sturdy in construction and which will give a long life in service.

Other objects of this invention will appear in the following description and appended claims, reference being had to the accompanying drawings forming a part of this specification wherein like reference characters designate corresponding parts in the several views.

Figure 1:
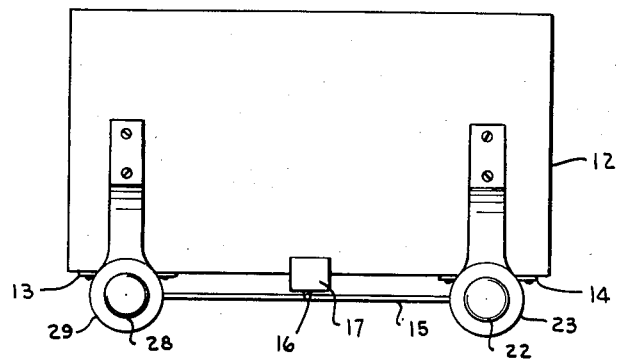
Fig. 1 is a top view of the hardness tester of the present invention.
Figure 2:
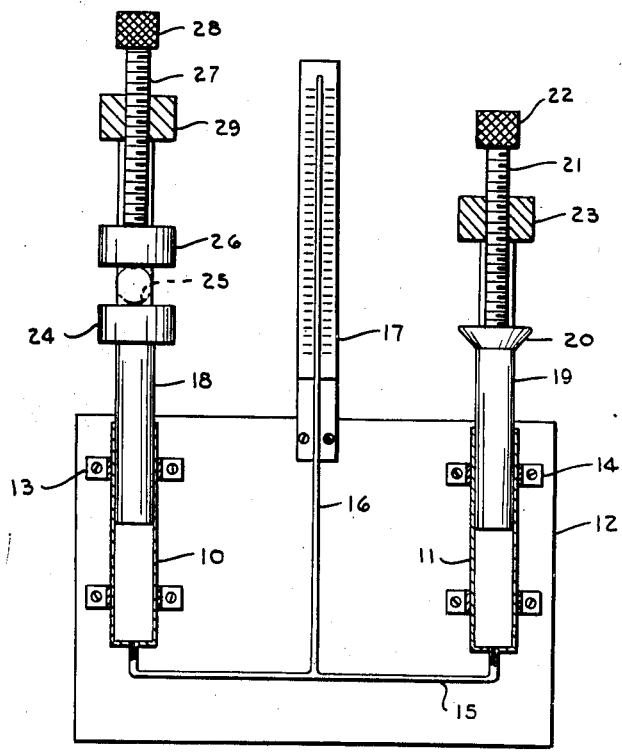
Fig. 2 is a front elevation of the device shown in Fig. 1, with certain parts shown in section to show more clearly the construction thereof.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The hardness tester of the present invention consists of two cylinders 10 and 11 connected to a support 12 by the brackets 13 and 14. The bottoms of the cylinders 10 and 11 communicate through the connector tube or pipe 15. The tube or pipe 15 may, if desired, be formed of a strong transparent material such as glass or a plastic, or it may be formed from any opaque tubing material such as a metal tube or pipe. The middle of the connector tube 15 is tapped by the vertical transparent tube 16 which extends upward along a calibrated indicator 17. The connector tube 15 is filled with mercury or a like fluid which extends upward in the cylinders 10 and 11 against the bottom of pistons 18 and 19, and upward into the vertical tube 16.

The top of piston 19 is formed with a flanged collar 20 which is adapted to receive one end of force-applying means in the form of a screw-threaded shaft 21. The other end of the shaft 21 is provided with a knurled handle 22. The shaft 21 extends through a screw-threaded hole in a supporting bracket 23 which is attached to the support 12.

The top of piston 18 is provided with a flat anvil 24 adapted to receive a specimen 25 to be tested. An adjustable platform 26 is provided on one end of a screw-threaded shaft 27, and a knurled handle 28 is provided at the other end of said screw-threaded shaft 27. The shaft 27 extends through a screw-threaded hole in a bracket 29 which is attached to the body member 12.

The device of the present invention is operated as follows:

With the platform 26 out of contact with the anvil 24, the handle 22 is adjusted so that the mercury column is at the zero point on the indicator 17. A specimen 25 is then placed on the platform 24 and the shaft 27 is screwed down until the platform 26 contacts the specimen 25. The handle 22 of the shaft 21 is then turned to screw the shaft 21 downward, thus forcing the piston 19 downward against the mercury column extending into the cylinder 11. The force is transmitted through the mercury column in the connector tube and the bottom of cylinder 10 to the bottom of piston 18, thus forcing the anvil 24 upward against the specimen 25. As the pressure in the connector tube 15 is increased, the mercury column rises in the tube 16 along the calibrated indicator 17, and the force which is being exerted at the breakdown point can be read on the said calibrated indicator 17. As the handle 22 is turned to screw the shaft 21 downward, more force is applied against the mercury column which rises in the tube 17 until the specimen 25 collapses. When the specimen 25 collapses, the mercury column will suddenly drop in the tube 16. The highest reading on the indicator 17 prior to the sudden drop of the mercury column in the tube 16 is the record of the force required to crush the specimen.

Although manual means for applying force against the specimen is demonstrated in the drawings, the device can be readily adapted to permit mechanical means to be utilized to adjust the force against specimens of extreme hardness.

Having thus described my invention, I claim:

1. A device for testing the resistance of carbon black pellets to breakdown, comprising a support; two vertical cylinders affixed to said support and communicating through a single connector tube affixed to the bottom of each of said cylinders; a piston disposed in each of said cylinders and extending through the top thereof; a fluid extending through the said connector tube and into the said cylinders against the bottom of the said pistons; an anvil disposed atop one of said pistons; a pair of brackets carried by said support, each having a screw-threaded opening disposed adjacent each of said cylinders; an adjustable force-applying shaft disposed in screw-threaded engagement within the opening of one of said brackets, and adapted to engage the top of one of said pistons; an adjustable shaft disposed in screw-threaded engagement within the opening of the other of said brackets and adapted to cooperate with the anvil of the other of said pistons; and indicating means communicating with said connector tube between said cylinders to indicate the amount of force exerted on said fluid by the said force-applying shaft.

2. A device as claimed in claim 1 and further characterized in that the said indicating means comprises a transparent closed vertical tube and a calibrated indicator member extending along said vertical tube and secured to the said support to measure the height of the fluid column in said transparent vertical tube.

3. A device for testing the hardness or resistance to breakdown of carbon black pellets, said device comprising a support; two cylinders vertically mounted to the said support and communicating at their bottoms through a single connector tube filled with mercury; a vertical transparent tube closed at its top and communicating with said connector tube between the two said cylinders; a calibrated indicator extending along said vertical tube and secured to said support to measure the height of a mercury column in the vertical tube when force is applied against the said mercury in the connector tube; a piston disposed in each of said cylinders and extending through the top thereof; an anvil formed at the top of one said pistons and adapted to underlie the carbon black pellet being tested; a pair of guide members each secured to said support adjacent one of said cylinders and having a screw-threaded hole therein; a pair of screw-threaded adjustable vertical shafts each in screw-threaded engagement with the hole in one of said guide members and being disposed above and in axial alignment with one of said cylinders, each of said shafts having a knurled handle portion at its upper end to facilitate adjustment thereof and permit transfer of force from said shaft to the piston in the aligned cylinder; and a platform formed on the lower end of one of said shafts adapted to fit against the top of the pellet being tested and force it in position against said anvil.

ARTHUR L. SWEIGART.

REFERENCES CITED

The following references are of record in the file of this patent:

UNITED STATES PATENTS

| Number | Name | Date |
|---|---|---|
| 227,867 | Wiesebrock | May 18, 1880 |
| 377,361 | Mill | Jan. 31, 1888 |
| 664,805 | Bosworth | Dec. 25, 1900 |
| 1,174,251 | Hankins et al. | Mar. 7, 1916 |
| 1,320,748 | Fisher | Nov. 4, 1919 |
| 2,041,869 | Smith et al. | May 26, 1936 |

FOREIGN PATENTS

| Number | Country | Date |
|---|---|---|
| 19,966 | Great Britain | A. D. 1906 |